United States Patent Office 3,586,590
Patented June 22, 1971

3,586,590
PROCESS FOR WELDING TWO PIECES OF PLASTIC BY FRICTION OF ONE AGAINST THE OTHER AND APPARATUS FOR CARRYING OUT THIS PROCESS
Henri Brenneisen, Paris, France, assignor to FAM Forschungs-Anstalt fur Mechanik, Vaduz, Liechtenstein
Filed Oct. 24, 1967, Ser. No. 677,650
Claims priority, application Switzerland, Nov. 8, 1966, 16,099/66; May 19, 1967, 7,087/67; June 12, 1967, 8,288/67
Int. Cl. B29c 27/08; B23k 1/06
U.S. Cl. 156—580      3 Claims

ABSTRACT OF THE DISCLOSURE

Process for welding two pieces of plastic by rubbing the pieces one against the other, in which one of the pieces is driven in a vibratory movement parallel to the other piece, and in which the two pieces being applied one against the other with a constant pressure during the entire duration of the vibratory movement. The duration of the vibratory movement is adjusted in proportion to the thickness of the piece to be welded, the frequency of the movement, and the pressure. Apparatus for carrying out this process includes an electric motor carrying an eccentric at the end of a shaft driving for vibrationally a metallic piece having a roughened face for engaging and moving one piece of plastic against the other.

---

In order to weld together two pieces of plastic, in particular of polypropylene, it is necessary to occasion a local melting of the two contacting pieces. For this purpose, the material must be heated. The methods heretofore proposed consist in heating the pieces electrically at high frequency, the plastic material being used as a dielectric in a capacity element or, ultrasonically, the pieces rubbing one against the other at a very high frequency; or, by means of a heating resistance causing fusion of the material, the pieces to be welded being then placed in contact one with the other very rapidly before cooling of this material.

The equipments for high frequency or ultrasonic welding are however of a high cost price and of a bulk which is difficult to reduce. The system of resistance heating also has disadvantages; in particular the difficulty in controlling with precision the temperature and the mechanical complication of the lowering of the resistance and the pressurizing of the two pieces one against the other.

It has also been proposed to weld pieces of plastic by mechanical heating obtained by rubbing one piece against the other. This process has been proposed in particular for welding pipes.

A principal object of the present invention is to provide a process for welding two thin pieces of plastic by rubbing the pieces one against the other. This process is characterized in that one of the pieces is driven in a vibratory movement parallel to the other piece, the two pieces being applied one against the other under constant pressure during the entire duration of the vibratory movement. Adjusting means are provided for controlling the duration of the vibratory movement in proportion to the thickness of the piece to be welded, the frequency of the movement, and the pressure.

Preferably, the pressure is at least 15 kg./cm.² and the vibration should not be less than 200 vibrations/second, the preferred value of the frequency, given by way of example, is of the order of 400 periods/second.

Moreover to make possible this welding, and also to make it possible for the two thin pieces to rub one against the other, it is naturally indispensable that one of the thin pieces be immobilized and that the thin piece in contact with the metallic piece be free in its movement. In addition, the pressure exerted simultaneously on the two thin pieces in contact to permit the welding should not be less than 15 kg./cm.².

It is also important that the duration of the operation be strictly timed, for if the time is insufficient, no welding can take place, while if the time is too long, the material to be welded will deteriorate.

Another object of the invention is an apparatus for carrying out the process, characterized essentially by the fact that it comprises an electric motor carrying an eccentric at the end of the shaft for driving in rotation a metallic piece having a roughened face for contacting one of the pieces to be welded to drive that piece against the other, and means for timing the duration of functioning of the apparatus. It has been observed that the configuration of the roughened face of the metallic piece has a considerable influence on the resistance of the welding.

Thus, according to another characteristic of the invention the said metallic piece has a plane surface divided into toothed zones and non-toothed zones the surface of which is recessed from the teeth, the toothed zones alternating with the non-toothed zones. During fusion of the polypropylene, the melting material will accumulate in the non-toothed zones separating two toothed zones instead of coming outside the welding thus reducing the resistance of the weld.

Additionally it has been noted by experience that there is risk of deteriorating or even tearing, the weld if one continues to drive the roughened surface while the two pieces to be welded already adhere one to the other, to alleviate this problem.

The metallic piece driven in vibration is subjected to the action of a sliding member acting on the metallic piece mounted elastically to apply it against the pieces to be welded, by means of a rounded body maintained laterally by said sliding member and engaged with play in a hollow of said metallic piece, in such a way as to permit the lateral displacement of the extremity of the metallic piece having this hollow, relative to said sliding member when the active extremity of the metallic piece is braked by the adherence of the two pieces to be welded, The accompanying drawing represents by way a nonlimiting example one embodiment of the apparatus according to the invention.

Figure 1:
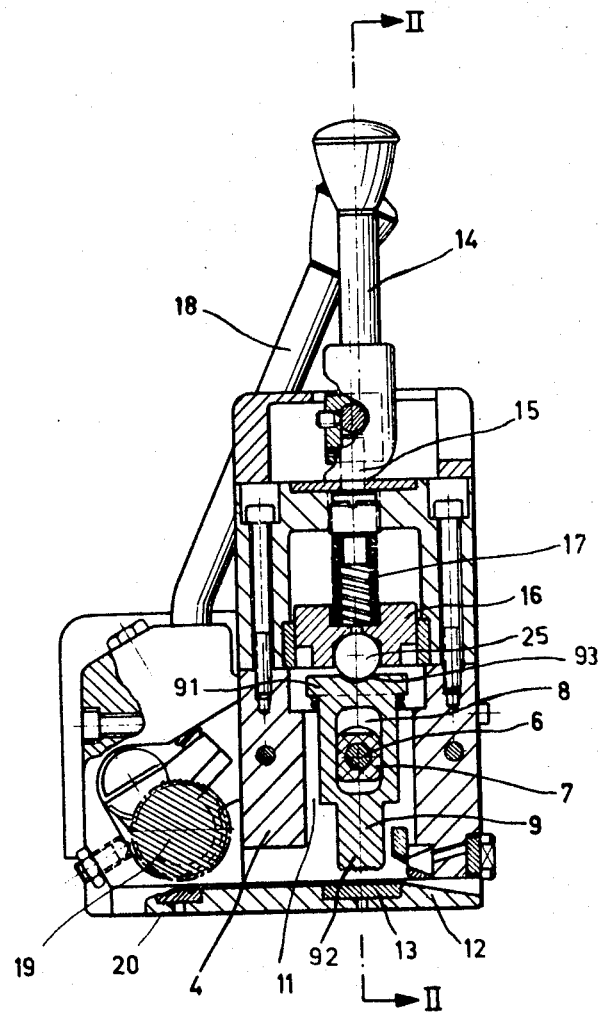
FIG. 1 shows a transversed view in cross-section, along line I—I of FIG. 2, of a device embodying the invention.

The apparatus shown in the drawing comprises a housing 1 for an electric motor 2, rotating for example at 24,000 rotations/minute, and held at its extremity 31 in a part 4 of the frame of the apparatus and at its middle by a collar 5.

The motor carries at the end of the shaft an eccentric member 6 having an eccentricity of about 1 mm. relative to the axis of the motor and turning in a block 7 sliding in a rectangular cavity or opening 8 of a driven means comprising a tool 9, the lower extremity of which carries asperities intended to drive one sheet of polypropylene relative to another.

Figure 2:
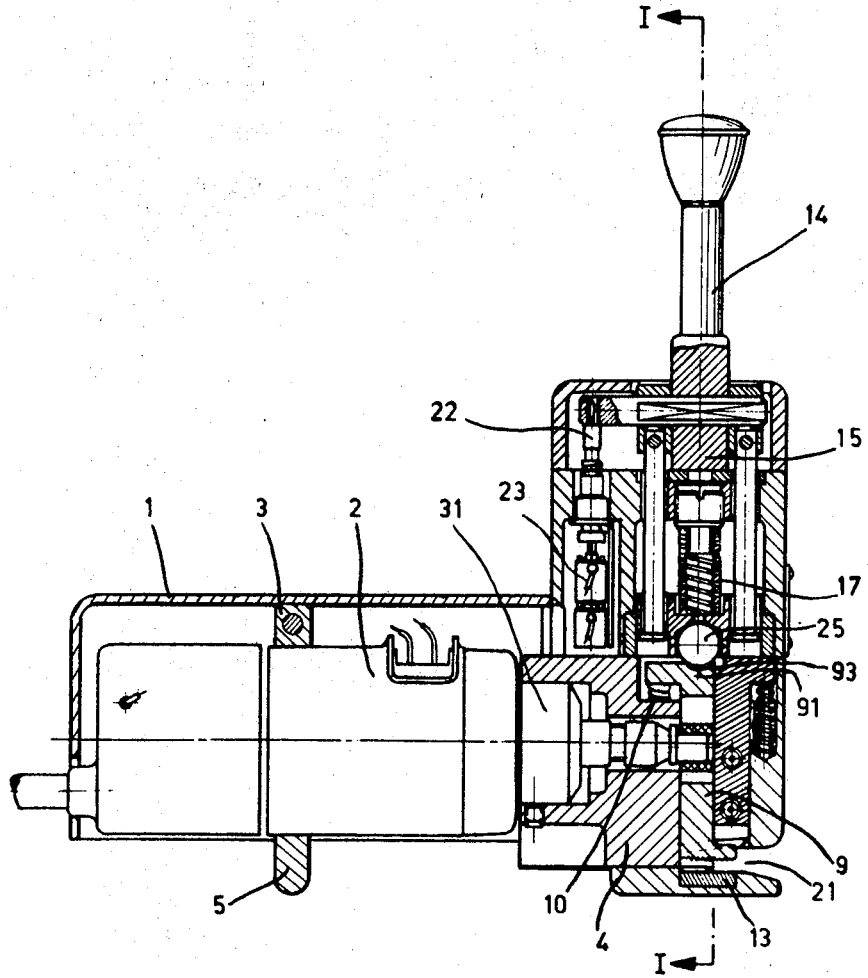
FIG. 2 shows a longitudinal cross-sectional view along line II—II of FIG. 1.

Tool 9 has in its upper part a shoulder 91 bearing on one or several springs 10 (FIG. 2) which in turn bear on a shoulder of piece 4. Tool 9 passes through piece 4 with lateral play 11 (FIG. 1) permitting tool 1 to oscillate when it is driven by eccentric 6.

Under piece 4 is secured a base plate 12 in which is set a counterplate 13 cooperating with tool 9.

Tool 9 is lowered by means of a lever 14, the eccentric extremity of which 15 acts on piston 16 by means of a strong helical spring 17, the force of which is calculated in such a way that its pressure will not be less than 15 kg./cm.² when lever 14 is forced to its end.

A second lever 18 acts elastically on the toothed drum 19 cooperating with a counter-plate 20 for advancing the sheets.

Figure 3:
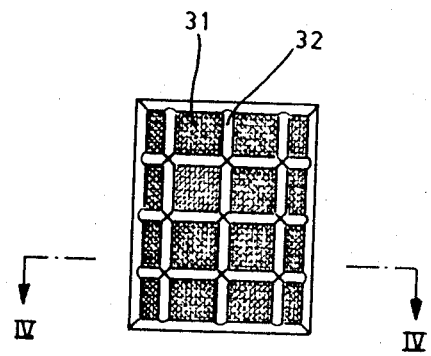
FIG. 3 shows in double scale the roughened surface of the metallic driving piece.
Figure 4:
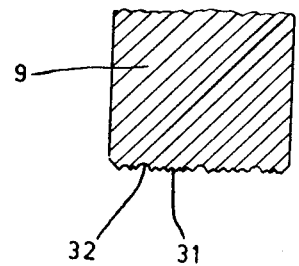
FIG. 4 shows a cross-sectional view taken along line IV—IV of FIG. 3.

The working surface of the tool is shown in FIGS. 3 and 4. This surface is divided into toothed zones 31 and narrower non-toothed zones 32, zones 32 constituting a network of channels between the toothed zones.

This shape of the working surface prevents a flow of the molten plastic material outside the perimeter of the working surface by permitting this material to flow in the channels and to accumulate therein.

This permits a weld to be made without burrs, notably those which take place in the direction of friction and permits a stronger connection since flow in the reserve zones creates, after cooling of the material, a thick welding zone which is not deteriorated by the teeth.

In a modification, the edges of the perimeter of the working surface of the tool can be raised in such a way as to present a boss touching the teeth and coming to apply themselves on the sheets without damaging them, in such a way that the material can flow between these bosses and the marginal teeth of the tool in order to prevent all flow of the material outside the perimeter of the tool.

It is understood that the working surface shown in the drawing is only one embodiment possible in an infinite number, the principle being to alternate the toothed zones and the flow zones, the different flow zones being preferably mutually linked.

The sheets to be welded are introduced frontally in the apparatus by the slightly biased opening 21. The motor is placed automatically in operation when lever 14 is lowered by the action of a pusher 22 driven by this lever and acting on interrupters 23.

Piston 16 acts on tool 9 through a tempered steel ball 25 held laterally in a housing of piston 16. This ball bears against the bottom of a socket or concave hollow 93 of small depth made at the end 91 of tool 9.

At the start of the welding operation, when the free upper sheet is driven by the tool on the stretched lower sheet, the rubbing of ball 25 against the piston and the tool is such that extremity 91 of the tool does not move laterally relative to piston 16, while the active end 92 of the tool oscillates at a small amplitude under the action of eccentric 6. On the contrary, when the resistance of the upper sheet increases as a result of the superficial melting of the contacting plastic surfaces causing adherence of the upper sheet on the lower sheet and a substantial braking of the tool, the resistance due to the friction of ball 25 becomes less than the resistance of the sheet and the extremity 91 of the tool begins to oscillate around the immobilized extremity 92. Thus, the weld is not damaged, and tearing of the upper sheet by the roughened portions is avoided.

Instead of a ball, it is possible naturally to use other rounded bodies for example a cylindrical element.

The process of the invention is naturally not limited to the welding of members but can be used for welding all thin sheets which can be driven in vibration, one relative to the other, in a manner such as to provoke friction between the two pieces.

What is claimed is:

1. Apparatus for welding together two thin pieces of plastic material comprising an electric motor having a shaft and an eccentric member at the end of said shaft, driven means connected with said eccentric member for vibration thereby upon rotation of said shaft, said driven means comprising a tool having a cavity therein and a block slidable in said cavity, said eccentric member being connected with said block, one end of said tool having a roughened face for contacting one of said pieces of plastic to cause it to move with said driven means, and the other end of said tool having socket means, and means for applying pressure between said driven means and said one piece of plastic to press said one piece of plastic against the other piece of plastic, said pressure applying means comprising a rounded member resiliently engaging said socket means for exerting pressure thereon, whereby upon rotation of said shaft said tool vibrates and said roughened face moves laterally, thereby driving said one piece of plastic against the other, and means for allowing said socket means to float when a weld is developed by fusion between said two pieces of plastic, whereupon lateral movement of said roughened face ceases and said socket means oscillates about a fixed pivot point at the roughened face of said tool.

2. Apparatus according to claim 1, wherein the roughened surface of said driven means is divided into toothed zones, and non-toothed zones having a surface which is recessed from said teeth, said toothed zones alternating with said non-toothed zones, for providing an undamaged continuous weld.

3. Apparatus according to claim 2 wherein said non-toothed zones are interconnected, so that during fusion of the plastic material, said material can flow within said non-toothed zones.

References Cited

UNITED STATES PATENTS

| 3,442,732 | 5/1969 | Stensaker et al. | 156—580X |
| 3,442,733 | 5/1969 | Vilcins | 156—580X |
| 3,442,734 | 5/1969 | Ericsson | 156—580X |
| 3,442,735 | 5/1969 | Stensaker | 156—580X |

SAMUEL W. ENGLE, Primary Examiner

J. J. DEVITT, Assistant Examiner

U.S. Cl. X.R.

156—73; 29—470.3